(12) United States Patent
Patel et al.

(10) Patent No.: US 12,249,241 B2
(45) Date of Patent: *Mar. 11, 2025

(54) METHODS AND SYSTEMS FOR DIGITAL ALERTING OF VEHICLES BASED ON A CHARACTERISTIC OF A ROAD AND AT LEAST ONE FACTOR CORRESPONDING TO AN OBJECT

(71) Applicant: HAAS, Inc., Chicago, IL (US)

(72) Inventors: Jigar Patel, Arlington Heights, IL (US); Cory Hohs, Chicago, IL (US); Jeremy Agulnek, Chicago, IL (US)

(73) Assignee: HAAS, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/912,425

(22) Filed: Oct. 10, 2024

(65) Prior Publication Data

US 2025/0037583 A1  Jan. 30, 2025

Related U.S. Application Data

(63) Continuation-in-part of application No. 18/378,605, filed on Oct. 10, 2023, which is a continuation-in-part of application No. 17/990,592, filed on Nov. 18, 2022, now Pat. No. 12,063,572.

(51) Int. Cl.
*G08G 1/0967* (2006.01)
*G08G 1/16* (2006.01)

(52) U.S. Cl.
CPC ............ *G08G 1/161* (2013.01); *G08G 1/166* (2013.01)

(58) Field of Classification Search
CPC .............................. G08G 1/161; G08G 1/166
See application file for complete search history.

(56) References Cited

U.S. PATENT DOCUMENTS

| | | | |
|---|---|---|---|
| 8,612,131 B2 | 12/2013 | Gutierrez et al. | |
| 9,396,210 B1 * | 7/2016 | Crook | H04W 4/33 |
| 9,659,496 B2 | 5/2017 | Massey et al. | |
| 10,008,111 B1 | 6/2018 | Grant | |
| 10,582,354 B1 * | 3/2020 | Isaac | G07C 5/008 |
| 12,033,506 B1 | 7/2024 | Deyaf et al. | |
| 12,109,938 B2 * | 10/2024 | Tucker | B60Q 1/46 |
| 2007/0159354 A1 | 7/2007 | Rosenberg | |
| 2008/0074286 A1 | 3/2008 | Gill et al. | |
| 2009/0174572 A1 | 7/2009 | Smith | |
| 2012/0313792 A1 | 12/2012 | Behm et al. | |
| 2014/0279707 A1 | 9/2014 | Joshua et al. | |
| 2015/0254978 A1 | 9/2015 | Mawbey et al. | |
| 2016/0210858 A1 | 7/2016 | Foster et al. | |
| 2017/0144669 A1 * | 5/2017 | Spata | E01C 23/01 |

(Continued)

*Primary Examiner* — An T Nguyen
(74) *Attorney, Agent, or Firm* — LOZA & LOZA, LLP

(57) ABSTRACT

Embodiments of a method, a non-transitory computer readable medium, and a system for vehicle alerting are disclosed. In an example, a computer-implemented method for alerting vehicles, the method including receiving, at a cloud computing system, digital data that includes location information about an object, determining, by the cloud computing system, a characteristic of a road that corresponds to the location information, and initiating, by the cloud computing system, a digital alerting operation for nearby vehicles in response to the characteristic of the road and at least one additional factor that corresponds to the object.

18 Claims, 11 Drawing Sheets

(56) References Cited

U.S. PATENT DOCUMENTS

| | | | |
|---|---|---|---|
| 2017/0268896 A1* | 9/2017 | Bai | G01C 21/3484 |
| 2018/0268690 A1 | 9/2018 | Gebers | |
| 2020/0074853 A1 | 3/2020 | Miller et al. | |
| 2021/0097311 A1* | 4/2021 | McBeth | G08G 1/096775 |
| 2022/0013006 A1* | 1/2022 | Srivastava | G06F 16/29 |
| 2023/0124536 A1 | 4/2023 | Chien et al. | |
| 2024/0067087 A1* | 2/2024 | Tucker | B60Q 11/00 |
| 2024/0085214 A1* | 3/2024 | Nayak | G01W 1/10 |
| 2024/0094010 A1* | 3/2024 | Bernhardt | G01C 21/32 |

* cited by examiner

*450*

| Characteristics Of A Road That Corresponds To The Location Info | At Least One Additional Factor That Corresponds To The Object (e.g, Gleaned From The Digital Data) | Alert (Y/N) |
|---|---|---|
| FC1 - FC3 | Vehicle Located On Shoulder | Y |
| FC1 - FC3 | Vehicle Stationary > 120 sec | Y |
| FC1 - FC3 | Vehicle Located On Shoulder + Stationary | Y |
| FC1 - FC2 | Object = Person | Y |
| FC1 - FC2 | Object = Bicycle | Y |
| FC1 - FC3 | Object = Bicycle, Time = Dark | Y |
| FC1 - FC3 | Hazard Lights On | Y |
| FC1 - FC4 | Airbag Deployed | Y |
| FC1 - FC3 | Vehicle In "Park" | Y |
| FC1 - FC3 | Object = Obstacle (Tire, Animal, Trash, Rocks) | Y |
| FC7 | Object = School Bus Stopped | Y |
| FC7 | Object = Delivery Vehicle (Mail, Package) | Y |
| Speed Limit 25 mph | Actual Speed > 45mph | Y |
| Roadway Direction East To West Only | Direction Of Travel: West To East | Y |
| FC1 - FC3 | Object = Pothole | Y |

| Vehicle ID | Timestamp | Location Info (Lat/Long) |
|---|---|---|
| V1 | $t_1$ | $X_1/Y_1$ |
| V1 | $t_2$ | $X_2/Y_2$ |
| V1 | $t_3$ | $X_3/Y_3$ |
| V1 | $t_4$ | $X_4/Y_4$ |
| V1 | $t_5$ | $X_5/Y_5$ |
| V1 | $t_6$ | $X_5/Y_5$ |
| V1 | $t_7$ | $X_5/Y_5$ |
| V1 | $t_8$ | $X_5/Y_5$ |
| V1 | $t_9$ | $X_5/Y_5$ |
| V1 | $t_{10}$ | $X_5/Y_5$ |
| V1 | $t_{11}$ | $X_5/Y_5$ |
|  |  |  |

$t_5$–$t_{11}$: Stationary

| Vehicle ID | Location Information (Timestamp; Lat/Long) | Supplemental Information (Vehicle In Park) |
|---|---|---|

FIG. 6

METHODS AND SYSTEMS FOR DIGITAL ALERTING OF VEHICLES BASED ON A CHARACTERISTIC OF A ROAD AND AT LEAST ONE FACTOR CORRESPONDING TO AN OBJECT

CROSS-REFERENCE TO RELATED APPLICATIONS

The current application is a Continuation in Part of pending U.S. application Ser. No. 18/378,605, filed Oct. 10, 2023, which is a Continuation in Part of pending U.S. application Ser. No. 17/990,592, filed Nov. 18, 2022, both of which are hereby incorporated by reference.

BACKGROUND

Digital alerting is being used to improve roadway safety. For example, cloud based safety systems are being used to track in real time the locations of roadway hazards and the locations of vehicles that may benefit from a digital alert about a nearby roadway hazard. In conventional cloud based safety systems, vehicles such as police cars and fire trucks send notifications to the cloud based safety system that explicitly indicate when emergency lights of the vehicle are on and the explicit notification is used to alert nearby vehicles of the roadway hazard. In order for a safety system that provides digital alerts to vehicles to be effective, it is important that over alerting, which can lead to alert fatigue, is avoided. In large-scale cloud based safety systems, many objects that may present a roadway hazard that warrants digital alerting are not equipped to explicitly notify the cloud based safety system and it is not practical for a human to evaluate every potential roadway hazard to manually determine if nearby vehicles should be digitally alerted.

SUMMARY

Embodiments of a method, a non-transitory computer readable medium, and a system for vehicle alerting are disclosed. In an example, a computer-implemented method for alerting vehicles, the method including receiving, at a cloud computing system, digital data that includes location information about an object, determining, by the cloud computing system, a characteristic of a road that corresponds to the location information, and initiating, by the cloud computing system, a digital alerting operation for nearby vehicles in response to the characteristic of the road and at least one additional factor that corresponds to the object.

In an example, the digital data received at the cloud computing system indicates that the object is a vehicle that is stationary, the determined characteristic of the road is a Functional Class (FC) FC1, and initiating the digital alerting operation involves generating vehicle-specific digital alerts for nearby vehicles.

In an example, the digital data received at the cloud computing system indicates that the object is a vehicle that is in park, the determined characteristic of the road is FC1, and initiating the digital alerting operation involves generating vehicle-specific digital alerts for nearby vehicles.

In an example, the digital data received at the cloud computing system indicates that the object is a vehicle with a deployed airbag, the determined characteristic of the road is FC1, and initiating the digital alerting operation involves generating vehicle-specific digital alerts for nearby vehicles.

In an example, the digital data received at the cloud computing system indicates that the object is a bicyclist, the determined type of the road is FC1, and initiating the digital alerting operation involves generating vehicle-specific digital alerts for nearby vehicles.

In an example, the digital data received at the cloud computing system indicates that the object is a person, the determined type of the road is FC1, and initiating the digital alerting operation involves generating vehicle-specific digital alerts for nearby vehicles.

In an example, the digital data received at the cloud computing system indicates that the object is an animal, the determined type of the road is FC1, and initiating the digital alerting operation involves generating vehicle-specific digital alerts for nearby vehicles.

In an example, the digital data received at the cloud computing system indicates that the object is a roadway obstacle, the determined characteristic of the road is FC1, and initiating the digital alerting operation involves generating vehicle-specific digital alerts for nearby vehicles.

In an example, the digital data indicates that the object is travelling in a particular direction, the determined characteristic of the road is a particular direction of travel, and the particular direction of travel of the object does not match the particular direction of travel of the road.

In an example, the characteristic of the road is a Functional Class.

In an example, the digital alerting operation involves determining an alerting zone relative to the object, identifying vehicles that are within the alerting zone, and outputting vehicle-specific digital alerts for the vehicles that are within the alerting zone.

In an example, the characteristic of the road is a functional classification that includes interstate, other freeways or expressways, other principal arterial roadways, minor arterial, major collector, minor collector, and local roadways.

In an example, functional classifications of roads are functional classifications as defined by a government transportation agency.

In an example, determining the characteristic of the road that corresponds to the location information involves a reverse geocoding operation in which the location information is compared to a digital map to determine the characteristic of the road.

In an example, determining the characteristic of the road that corresponds to the location information involves a reverse geocoding operation in which the location information is compared to a digital map to determine a functional class of the road.

A non-transitory computer readable medium including instructions to be executed in a computer system is also disclosed. The instructions when executed in the computer system perform a method that involves receiving, at a cloud computing system, digital data that includes location information about an object, determining, by the cloud computing system, a characteristic of a road that corresponds to the location information, and initiating, by the cloud computing system, a digital alerting operation for nearby vehicles in response to the characteristic of the road and at least one additional factor that corresponds to the object.

A system is also disclosed. The system includes at least one processor and a non-transitory computer readable medium including instructions to be executed by the at least one processor. The instructions when executed by the at least one processor perform a method that includes receiving, at a cloud computing system, digital data that includes location information about an object, determining, by the cloud computing system, a characteristic of a road that corresponds to the location information, and initiating, by the cloud computing system, a digital alerting operation for nearby vehicles in response to the characteristic of the road and at least one additional factor that corresponds to the object.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 4 is a table of examples of characteristics of roads and at least one additional factor that when considered in combination by the safety cloud can trigger a digital alerting operation.

FIG. 5B is an example of a time-series of location information that is transmitted from a vehicle and received at the safety cloud.

FIG. 6 is a vehicle data message that includes a vehicle ID, location information, and supplemental information.

Throughout the description, similar reference numbers may be used to identify similar elements.

DETAILED DESCRIPTION

Figure 1:
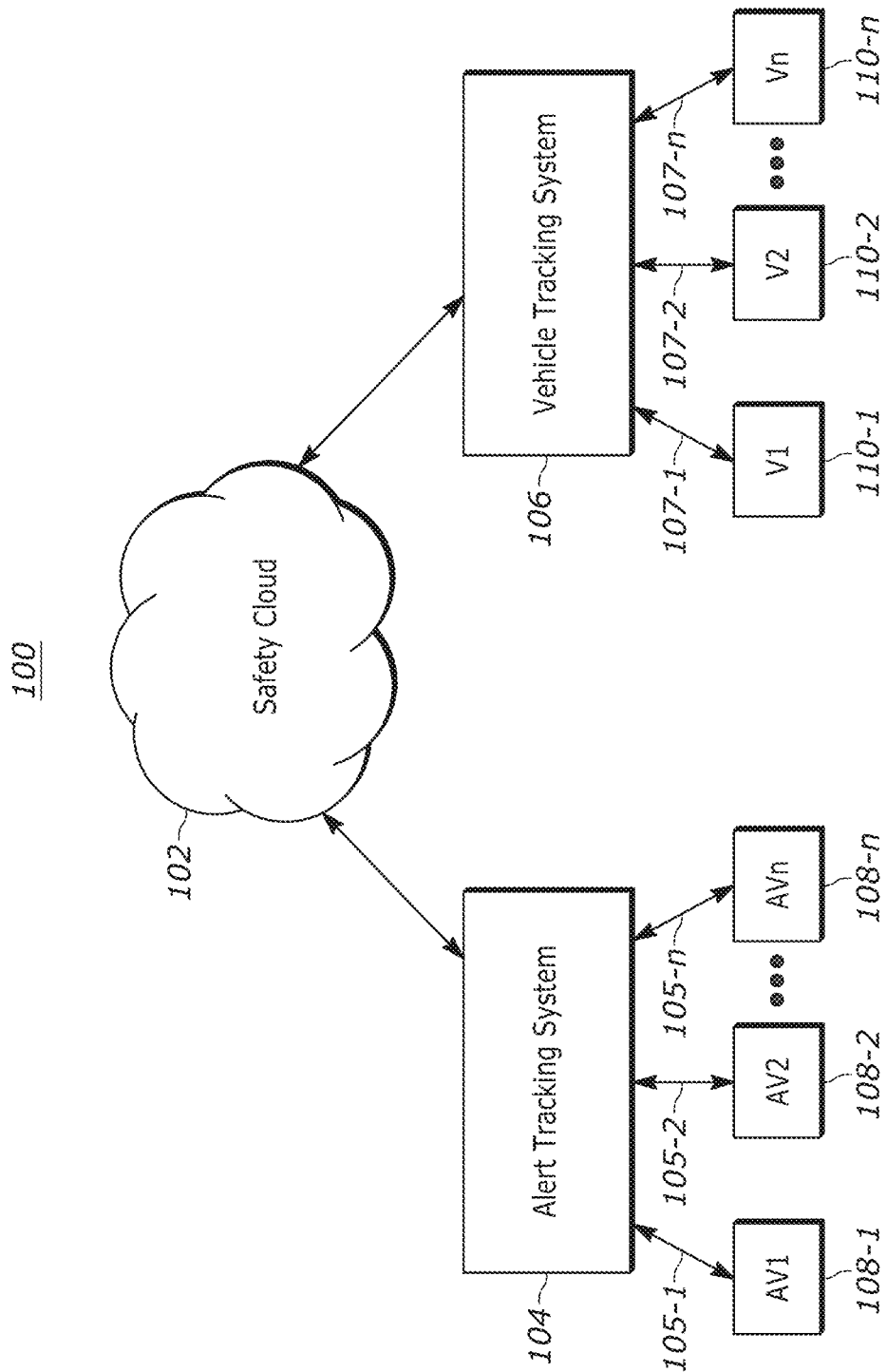
FIG. 1 is a high-level overview of a safety system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

An "alerting zone" may be characterized as a geographical area near an alerting vehicle, near a route of the alerting vehicle, near a roadway hazard (e.g., a construction zone, a car accident, a vehicle stopped along the side of the road, a lane closure, a road closure, debris/obstacle on a road, etc.), or any combination thereof. Examples of an alerting zone may include, but are not limited to, a geographical area that covers a projected path of an alerting vehicle (plus X miles along each side of the path), a geographical area that surrounds an alerting vehicle (by X miles or X feet) and that changes as the alerting vehicle changes locations (e.g., travels along a projected path), or a geographical area that is within an X (X represents a positive value) mile or feet radius of a roadway hazard. In some examples, the geographical area of an alerting zone is defined by a set of geographical coordinates that are within a predetermined range of a particular location. In some embodiments, the geographical area may resemble a circle, an oval, a rectangle, a line, or other shape. In some other embodiments, the geographical area may be identified by portions or segments of a road or roads that are near the hazard. In an embodiment, an alerting zone is determined by/in a safety cloud of a safety system. An example of a safety system is described in further detail with reference to FIG. 1.

FIG. 1 is a high-level overview of a safety system 100. The safety system 100 includes a safety cloud 102 that is connected to an alert tracking system 104 and to a vehicle tracking system 106. The safety cloud 102 may be implemented via software running on a computing system such as a remote server, a public cloud (e.g., AMAZON® Web Services (AWS), GOOGLE® Cloud, MICROSOFT® Azure, etc.), and/or a private cloud. In an embodiment, the safety cloud is implemented via a cloud computing system. The alert tracking system 104 and/or the vehicle tracking system 106 may be implemented via third-party computing systems, including for example, software running on a computing system such as a remote server, a public cloud, and/or a private cloud.

The alert tracking system 104 connects to one or more alerting vehicles (AVs), implemented as alerting vehicles AV1 108-1, AV2 108-2, and AVn 108-$n$ (where n represents an integer of one or more), via, for example, a wireless service provider network (e.g., 3G, 4G, 5G, etc.). Alerting vehicles AV1 108-1, AV2 108-2, and AVn 108-$n$ connect to the alert tracking system 104 over wireless connections via a first connection 105-1, a second connection 105-2, and an nth connection 105-$n$, respectively. Examples of the alerting vehicles include emergency vehicles (e.g., a police car, an ambulance, a firetruck, a military vehicle, or the like), safety vehicles (e.g., a construction vehicle, a towing vehicle, or the like), and/or other vehicles/devices that are capable of sending alerting vehicle data and/or connecting to the alert tracking system 104 over a wireless connection via a wireless service provider network. The alerting vehicles AVs 108-1, 108-2, and 108-$n$ may be included in an emergency vehicle fleet (e.g., a fleet of police cars corresponding to a police department, a fleet of firetrucks corresponding to a fire department, etc.). In an embodiment, the AVs 108-1, 108-2, and 108-$n$ are equipped with radios (e.g., a fixed radio and/or a mobile radio) to implement a wireless connection with a wireless service provider network. Although an alerting vehicle may commonly be a vehicle, the alerting vehicle may alternatively be an object with a radio that is capable of sending telemetry data and/or of connecting to the alert tracking system 104.

In an embodiment, alerting vehicles AV1 108-1, AV2 108-2, and AVn 108-$n$ transmit alerting vehicle telemetry data to the alert tracking system 104. As an example, the alerting vehicle telemetry data may include a vehicle ID that corresponds to and uniquely identifies the vehicle (e.g., AV1 308-1, AV2 308-2, or AVn 308-$n$), location information (e.g., longitude and latitude coordinates) that corresponds to the location of the vehicle, a speed, acceleration, trajectory, direction, and/or azimuth of the vehicle, and an alert ID that indicates whether emergency lights of an alerting vehicle are on/off. In an example, the alerting vehicles transmit alerting vehicle telemetry data to the alert tracking system on regular intervals, such as 2 second intervals. In some examples, the interval may be different depending on the state of the alerting vehicle, for example, in a range of 1-20 second intervals. For example, an alerting vehicle may transmit vehicle telemetry data at shorter time intervals while the vehicle is in an alerting state (e.g., while its emergency lights are on).

The vehicle tracking system 106 connects to one or more vehicles (V), implemented as vehicles V1 110-1, V2 110-2, and Vn 110-$n$ (n represents an integer greater than one), via a wireless service provider wireless network. Vehicles V1 110-1, V2 110-2, and Vn 110-$n$ connect to the vehicle tracking system over wireless connections via a first connection 107-1, a second connection 107-2, and an nth connection 107-$n$, respectively. As described herein, a "vehicle" may refer to a civilian vehicle, a consumer vehicle, or more generally to a vehicle that is not configured as an alerting vehicle. For example, the vehicles V1 110-1, V2 110-2, and Vn 110-$n$ are considered as "non-alerting" vehicles because the vehicles are not connected to the alert tracking system 104, the vehicles do not have emergency lights or a siren, and/or the vehicles are not configured to transmit an alert signal or notification that explicitly indicates, for example, whether or not emergency lights and/or siren are on. The vehicles V1 110-1, V2 110-2, and Vn 110-$n$ may be included in a vehicle fleet (e.g., a fleet of cars owned by a company). In an embodiment, the vehicles V1 110-1, V2 110-2, and Vn 110-$n$ are equipped with radios (e.g., a fixed radio and/or a mobile radio) to implement a wireless connection to a wireless service provider network. In an embodiment, vehicles V1 110-1, V2 110-2, and Vn 110-$n$ periodically send vehicle telemetry data to the vehicle tracking system 106 via the wireless service provider network. In an example, the vehicles transmit vehicle telemetry data to the vehicle tracking system on regular intervals, such as 2 second intervals. In some examples, the interval may be different depending on different factors, for example in a range of 1-20 second intervals. For example, a vehicle may transmit vehicle telemetry data at shorter time intervals while the vehicle is in an alerting zone. In an example, the vehicle telemetry data may include a vehicle ID that corresponds to and uniquely identifies the vehicle (e.g., V1 110-1, V2 110-2, or Vn 110-$n$), location information (e.g., longitude and latitude coordinates) that corresponds to the location of the vehicle, a speed, acceleration, trajectory, direction, and/or azimuth of the vehicle although the vehicle telemetry data may include other types of information. Although vehicles V1 110-1, V2 110-2, and Vn 110-$n$ may commonly be vehicles, the vehicles V1, V2, and/or Vn may also be an object such as a radio, a smartphone, or other similar device capable of sending telemetry data and/or of connecting to the vehicle tracking system 106.

In some embodiments, the safety cloud 102 receives alerting vehicle telemetry data from alerting vehicles AV1 108-1, AV2 108-2, and/or AVn 108-$n$ via the alert tracking system 104, and receives vehicle telemetry data from vehicles V1 110-1, V2 110-2, and/or Vn 110-$n$ via the vehicle tracking system 106. The safety cloud 102 may use the alerting vehicle telemetry data to determine an alerting zone that is associated with an alerting vehicle. The safety cloud 102 may use the vehicle telemetry data to determine whether any non-alerting vehicles are located in the alerting zone, and to determine whether or not to provide a digital alert to vehicles that are located in the alert zone, where the digital alert may indicate that there is a roadway hazard nearby.

Cloud based safety systems, similar to the system described with reference to FIG. 1, may establish an alerting zone relative to an alerting vehicle and then send digital alerts to non-alerting vehicles that are located within the alerting zone. A conventional way of establishing an alerting zone involves identifying a geographical area that covers a projected path of an alerting vehicle and/or a geographical area that surrounds the alerting vehicle or that surrounds some roadway hazard.

Examples of how a cloud-based safety system can be used to alert vehicles of potential roadway hazards is described with reference to FIGS. 2A, 2B, and 3A-3E.

Figure 2A:
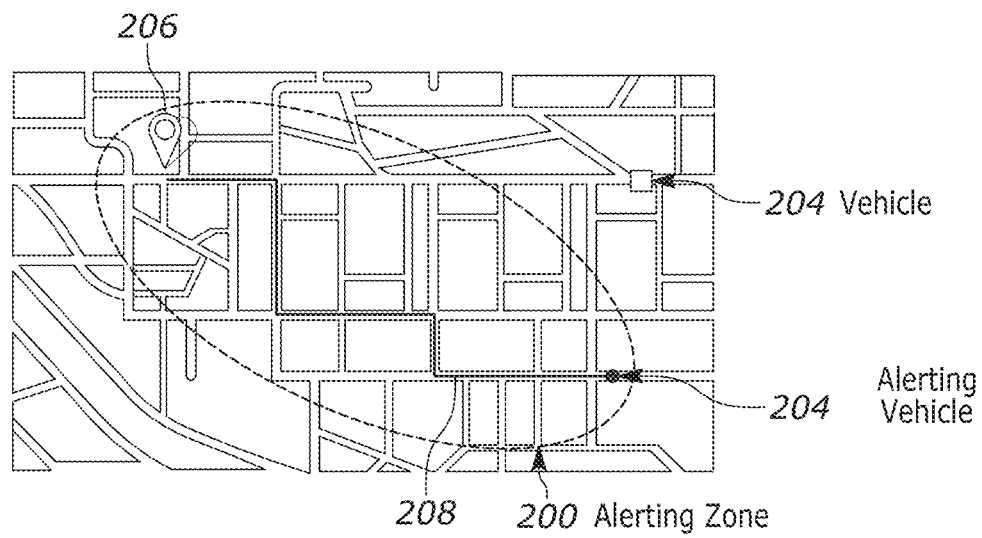
FIG. 2A depicts an example of a vehicle located outside an alerting zone.

FIG. 2A depicts an example of a vehicle 202 that is located outside of an alerting zone 200. In the example illustrated by FIG. 2A, the alerting zone 200 is a geographical area that surrounds an alerting vehicle 204, or some other roadway hazard. In the example, the alerting zone 200 is established by the safety cloud in response to receiving an indication that an alerting vehicle has its warning lights on and includes a geographical area around a destination 206 of the alerting vehicle 204 and a projected path 208 of the alerting vehicle to the destination. The destination 206 may be, for example, an emergency site (e.g., a car accident, a structure fire, a crime site, or the like), a safety hazard (e.g., a weather hazard, a road closure, a lane closure, a road obstruction, or the like), or other similar roadway hazard. Because the vehicle 202 is located outside of the alerting zone 200, the safety cloud determines that the vehicle does not need to be alerted about the presence of the alerting vehicle 204. Thus, no alerting message is sent to the vehicle 202.

Figure 2B:
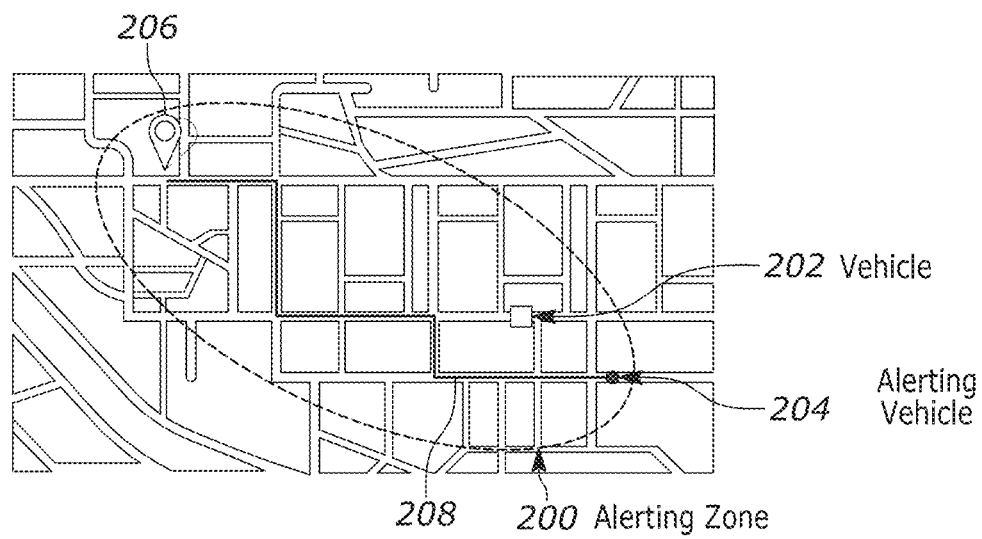
FIG. 2B depicts an example of a vehicle located in an alerting zone.

FIG. 2B depicts an example of the vehicle 202 being located in the alerting zone 200. In the example shown illustrated in FIG. 2B, the alerting zone 200 includes the alerting vehicle 204, the projected path 208 of the alerting vehicle, and the destination 206 of the alerting vehicle as described with reference to FIG. 2A. In contrast to FIG. 2A, the vehicle 202 shown in FIG. 2B is located in the alerting zone 200. Because the vehicle 202 is located in the alerting zone 200, the safety cloud determines that the vehicle needs to be alerted about the presence of the alerting vehicle 204. Thus, an alerting message (also referred to as a digital alert) is sent to the vehicle 202. In some examples, the safety cloud is configured to notify vehicles that are nearby a roadway hazard (which may include a moving roadway hazard such as a moving police car, or a stationary roadway hazard such as a disabled vehicle on the shoulder of a freeway) by providing digital alerts to the nearby vehicles. In an example, nearby vehicles are vehicles that are located within an alerting zone. In other examples, nearby vehicles are vehicles that are projected to encounter the roadway hazard, whether the roadway hazard is moving or stationary. Vehicles that move into an active alerting zone may also be considered to be nearby the roadway hazard and thus receive a digital alert.

An example that illustrates the flow of data within a safety system, which is similar to the safety system 100 described with reference to FIG. 1, is described herein with reference to FIG. 3A-3E.

Figure 3A:
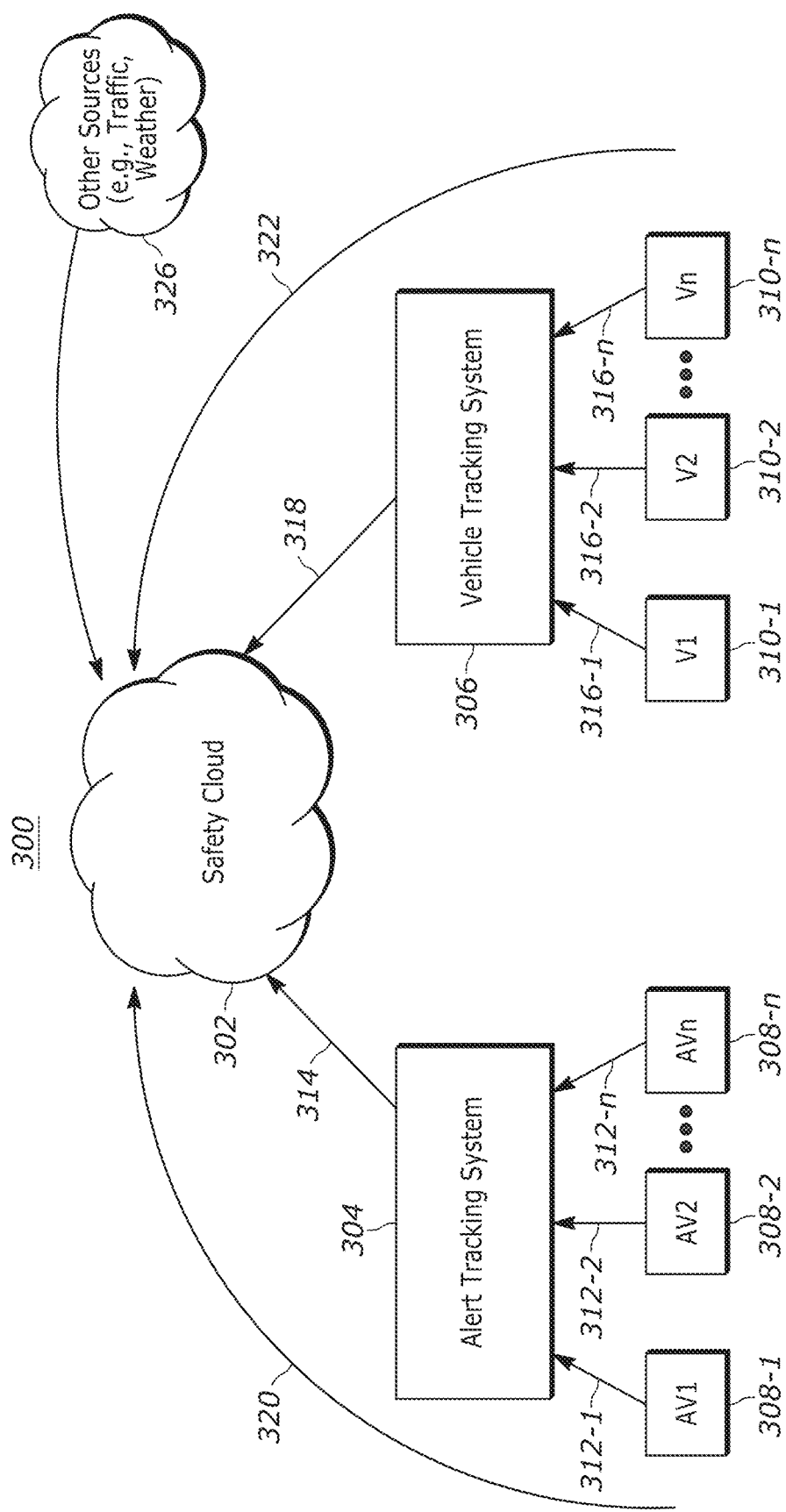
FIG. 3A illustrates an example of the flow of data to a safety cloud.

FIG. 3A illustrates an example of the flow of data to a safety cloud. The flow of data to the safety cloud may represent a process for collecting data (e.g., from alerting vehicles and from non-alerting vehicles). In particular, the example of FIG. 3A illustrates a safety system 300 that includes a safety cloud 302, an alert tracking system 304 that communicates with alerting vehicles AV1 308-1, AV2 308-2, and/or A Vn 308-n, and a vehicle tracking system 306 that communicates with vehicles V1 310-1, V2 310-2, and/or Vn 310-n as described with reference to FIG. 1. The example of FIG. 3A illustrates the flow of data to the safety cloud 302. In an embodiment, alerting vehicles AV1 308-1, AV2 308-2, and/or AVn 308-n share alerting vehicle telemetry data with the alert tracking system 304 via wireless connections (represented by arrows 312-1, 312-2, and 312-n). In an example, the alerting vehicle telemetry data may include a vehicle ID, location information at a particular time (e.g., a timestamp and latitude and longitude coordinates), speed, acceleration, trajectory, direction, and/or azimuth, and an alert ID that corresponds to an alerting status/mode of an alerting vehicle, e.g., lights on/off. The alert tracking system 304 shares the alerting vehicle telemetry data with the safety cloud 302 (represented by arrow 314). In an embodiment, vehicles V1 310-1, V2 310-2, and/or Vn 310-n share vehicle telemetry data with the vehicle tracking system 306 at regular intervals (e.g., every 2 seconds) via wireless connections (represented by arrows 316-1, 316-2, and 316-n). In an example, the vehicle telemetry data may include a vehicle ID, location information (e.g., timestamp and latitude and longitude coordinates), speed, acceleration, trajectory, direction, and/or azimuth. The vehicle tracking system 306 shares the vehicle telemetry data with the safety cloud 302 (represented by arrow 318).

In some embodiments, alerting vehicles AV1 308-1, AV2 308-2, and/or AVn 308-n share alerting vehicle telemetry data directly with the safety cloud 302 (represented by arrow 320), and/or vehicle V1 310-1, V2 310-2, and/or Vn 310-n share vehicle telemetry data directly with the safety cloud 302 (represented by arrow 322). In such an embodiment, alerting vehicles AV1 308-1, AV2 308-2, and/or AVn 308-n share alerting vehicle telemetry data directly with the safety cloud 302 by bypassing the alert tracking system 304, and vehicles V1 310-1, V2 310-2, and/or Vn 310-n share vehicle telemetry data directly with the safety cloud 302 by bypassing the vehicle tracking system 306.

Although the alert tracking system 304 is described as sharing alerting vehicle telemetry data from alerting vehicles AV1 308-1, AV2 308-2, and/or AVn 308-n, the alert tracking system may also share vehicle telemetry data from other vehicles or devices (e.g., a roadside vehicle, a roadside sensor, a maintenance vehicle, a construction site device, drawbridge warning lights, railroad crossing gate/lights etc.). Additionally, the alerting vehicle telemetry data may correspond to other alert-related data such as, for example, a weather hazard, a lane closure, a road obstruction, a construction site, traffic, etc. In some embodiments, other parties may have access to the alert tracking system 304, such that the other parties (e.g., construction teams, utility teams, weather tracking teams, etc.) may tap into the alert tracking system and input/send alert-related data to the safety cloud 302 to indicate a safety hazard and/or an alerting zone. In such an embodiment, the other parties may input alert-related data that includes a specific location (e.g., an address or longitude and latitude coordinates) and/or a zone and an alert status (e.g., construction active, drawbridge up, railroad crossing gate down) to indicate the safety hazard and/or the alerting zone. Additionally, other sources 326 may provide information in the form of digital data to the safety cloud. For example, other sources of digital data may include third-party sources such as commercial mapping entities (WAZE®, GOOGLE® Maps, APPLE® Maps), weather entities (e.g., government or private sources of weather information), vehicle manufacturers that maintain a vehicle tracking system, and/or from transportation authorities, such as state or local government transportation authorities.

Figure 3B:
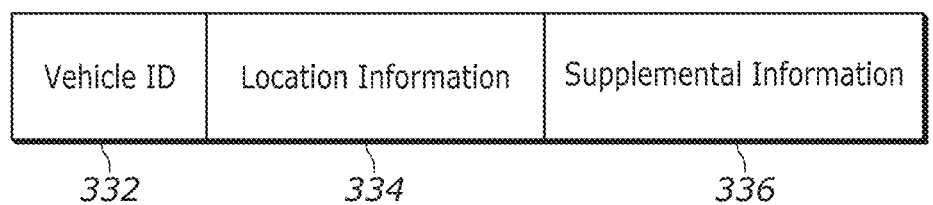
FIG. 3B is an example of a vehicle data message that is used to communicate vehicle telemetry data from a vehicle.

FIG. 3B is an example of a vehicle data message 330 that is used to communicate vehicle telemetry data from a vehicle (V1 310-1, V2 310-2, . . . Vn 310-n) to the vehicle tracking system 306 and/or to the safety cloud 302. In the example, the vehicle data message 330 includes three fields, implemented as a vehicle ID field 332, a location information field 334, and a supplemental information field 336. The vehicle ID field 332 may indicate a vehicle ID (e.g., a multibit vehicle identifier) that is unique to each vehicle (e.g., V1 310-1, V2 310-2, and/or Vn 310-n). The location information field 334 may indicate location information that corresponds to the location of the vehicle at a particular time, e.g., timestamp and latitude and longitude coordinates as provided from an on-vehicle GPS receiver). The supplemental information field 606 may include, for example, data indicative of motion of the vehicle such as speed, acceleration, trajectory, direction, and/or azimuth of the vehicle, an indication of the type or class of vehicle, vehicle status information such as an indication that the vehicle's headlights are on, an indication that the vehicle's hazard lights are on, an indication that the vehicle's windshield wipers are on, an indication that a tire on the vehicle is flat, and indication that an airbag in the vehicle has been deployed, and/or an indication that the vehicle is park, drive, or reverse. Although the vehicle data message 330 is shown in FIG. 3B as including three fields, the vehicle data message may have more than or less than three fields that indicate the same or different information. In an embodiment, the vehicle data message 330 is sent by a vehicle (e.g., V1 310-1, V2 310-2, and/or Vn 310-n) to the vehicle tracking system 306 at regular intervals (e.g., every 2 seconds) via a wireless service provider network, and then shared with the safety cloud 302 by the vehicle tracking system. In another embodiment, the vehicle data message 330 is sent by a vehicle directly to the safety cloud via a wireless service provider network.

Figure 3C:
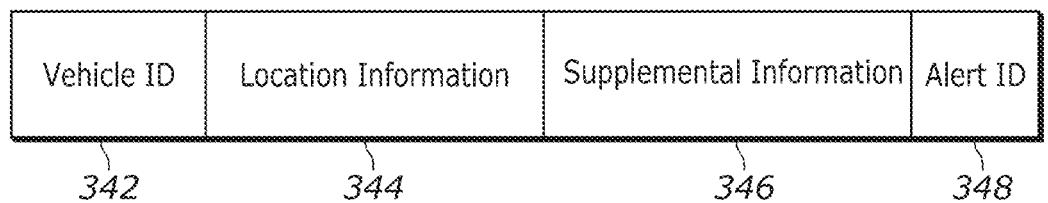
FIG. 3C is an example of an alerting vehicle data message that is used to communicate alerting vehicle telemetry data from an alerting vehicle.

FIG. 3C is an example of an alerting vehicle data message 340 that is used to communicate alerting vehicle telemetry data from an alerting vehicle (AV1 308-1, AV2 308-2, . . . AVn 308-n) to the alert tracking system 304 and/or to the safety cloud 302. In the example, the alerting vehicle data message 340 includes four fields, implemented as a vehicle ID field 342, a location information field 344, a supplemental information field 346, and an alert ID field 348. The vehicle ID field 342 may indicate a unique vehicle ID (e.g., a multibit vehicle identifier) that corresponds to an alerting vehicle (e.g., AV1 308-1, AV2 308-2, and/or AVn 308-n). The location information field 344 may indicate location information that corresponds to the location of the vehicle at a particular time (e.g., timestamp and latitude and longitude coordinates) as provided from an on-vehicle GPS receiver. The supplemental information field 346 may include, for example, data indicative of motion of the vehicle such as speed, acceleration, trajectory, direction, azimuth of the vehicle, and/or other information about the vehicle. The alert ID field 348 may include an alert ID that indicates an alerting mode of the vehicle, e.g., whether the alerting vehicle has its emergency lights on or off and/or has its emergency siren on or off. In an example, the status of the emergency/warning lights of an alerting vehicle, as indicated by the value in the alert ID, is used to establish and remove alerting zones. For example, the safety cloud may establish an alerting zone and send digital alerts accordingly when the value in the alert ID field indicates that the alerting vehicle has its warning lights on, and the safety cloud may end an alerting zone and the corresponding alerting when the value in the alert ID field indicates that the alerting vehicle no longer has its warning lights on. Although the alerting vehicle data message 340 is shown in FIG. 3C as including four fields, the alerting vehicle data message may have more than or less than four fields that indicate the same or different information. In an embodiment, the alerting vehicle data message 340 is sent by an alerting vehicle (e.g., AV1 308-1, AV2 308-2, and/or AVn 308-n) to the alert tracking system 304 via a wireless service provider network, and then shared with the safety cloud 302 by the alert tracking system. In another embodiment, the alerting vehicle data message 340 is sent by an alerting vehicle directly to the safety cloud 302 via a wireless service provider network.

Figure 3D:
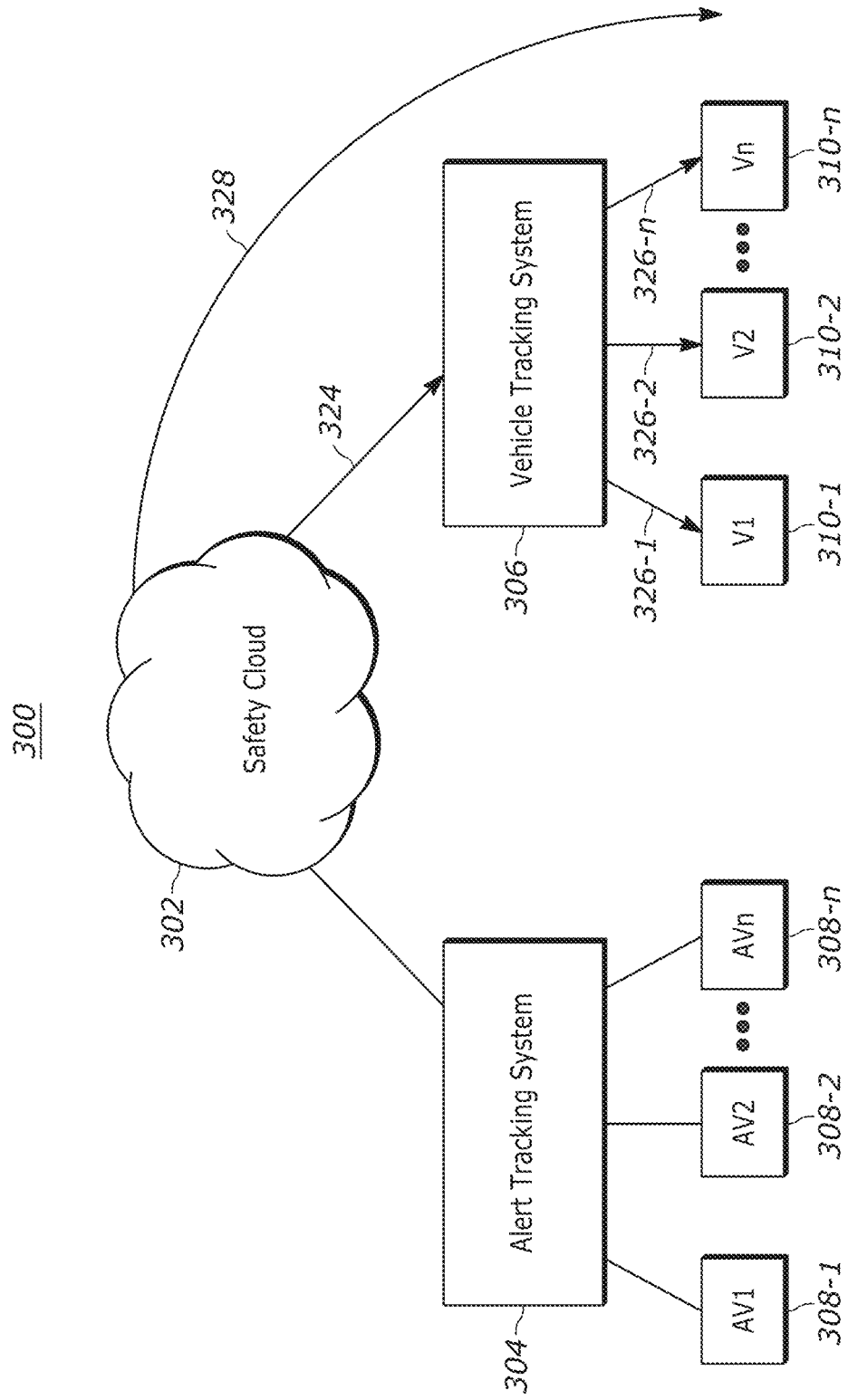
FIG. 3D illustrates an example of the flow of data to vehicles.

FIG. 3D illustrates an example of the flow of data to vehicles. The flow of data to the vehicles may represent a process for sending digital alerts to the vehicles (V1 310-1, V2 310-2, and/or Vn 310-n) also referred to as digital alerting. In particular, the example of FIG. 3D illustrates the safety system 300, including the safety cloud 302, the alert tracking system 304 that communicates with alerting vehicles AV1 308-1, AV2 308-2, and/or AVn 308-n, and the vehicle tracking system 306 that communicates with vehicles V1 310-1, V2 310-2, and/or Vn 310-n as described with reference to FIG. 3A. In contrast to FIG. 3A, the example of FIG. 3D illustrates the flow of data (e.g., digital alerts) from the safety cloud 302 to the vehicles V1 310-1, V2 310-2, and/or Vn 310-n. The safety cloud 302 may generate an alert message for transmission to vehicles V1 310-1, V2 310-2, and/or Vn 310-n when a vehicle is within an alerting zone. In an example, the safety cloud 302 sends digital alerts in the form of an alerting message to the vehicle tracking system 306 (represented by arrow 324) and the vehicle tracking system 306 sends a digital alert in the form of an alert message to corresponding vehicles V1 310-1, V2 310-2, and/or Vn 310-n via wireless connections (represented by arrows 326-1, 326-2, and 326-n). In another example, the safety cloud 302 sends a digital alert directly to a corresponding vehicle V1 310-1, V2 310-2, and/or Vn 310-n via a wireless connection (represented by arrow 328). In some embodiments, the same alert message is sent to all the vehicles that are included in the safety system 300 and within an active alerting zone. In some embodiments, an alert message is vehicle-specific, such that a different vehicle-specific alert message is sent to each of the vehicles that is within an alerting zone.

Figure 3E:
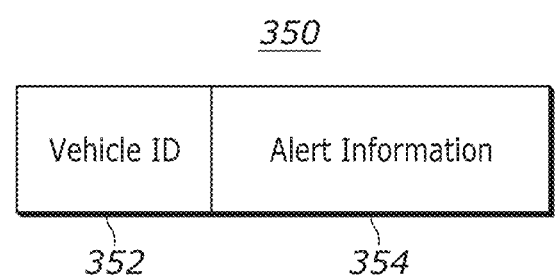
FIG. 3E depicts an example of a digital alert in the form of an alert message that is generated by a safety cloud.

FIG. 3E depicts an example of a digital alert in the form of an alert message 350 that is generated by the safety cloud 302. In the example, the alert message 350 shown in FIG. 3E includes two fields, implemented as a vehicle ID field 352 and an alert information field 354. The vehicle ID field 352 may indicate a vehicle ID that is unique to each vehicle (e.g., V1 310-1, V2 310-2, and/or Vn 310-n), such that the vehicle ID is vehicle-specific. By using the vehicle ID, the alert message indicates which particular vehicle the alert message is intended for. Thus, the vehicle ID may improve the overall impact of alert messages because only the intended vehicle will recognize the digital alert as being intended specifically for that vehicle. The alert information field 354 may indicate an alert type. In one example, the alert information field 354 may be a single bit field and in other examples, the alert information field 354 may be a multibit field. In one example, there may be multiple different types of alert messages and in another example, there is only one type of alert message. In an embodiment, the alert information field 354 has a value that indicates a warning such as "beware of hazard," "fire truck ahead," "police car ahead," "tow truck ahead," "lane closure ahead," "construction ahead," or the like. Although the alert message 350 is shown in FIG. 3E as including two fields, the alert message may have more than or less than two fields that indicate the same or different information. In an embodiment, the alert message 350 is sent to the vehicle tracking system 306 by the safety cloud 302, and then sent by the vehicle tracking system to a transceiver of a vehicle (e.g., V1 310-1, V2 310-2, and/or Vn 310-n) via a wireless service provider network. In another embodiment, the alert message 350 is sent by the safety cloud to the transceiver of the vehicle via the wireless service provider network. In yet another embodiment, the alert message 350 is sent by the safety cloud to a broadcasting tower near an alerting zone via the wireless service provider network, and then sent by the broadcasting tower to the transceiver of the vehicle via a wireless service provider network.

In addition to vehicles such as police cars and fire trucks, which are equipped to explicitly notify the safety cloud when their emergency lights are on, other objects on or near a roadway may present a roadway hazard that warrants digital alerting, including, for example, disabled vehicles, bicyclists, pedestrians, animals, tires, rocks, trees, or other debris/obstacles. However, many objects are not equipped with a mechanism to explicitly notify the safety cloud that they may present a roadway hazard. For example, although many vehicles may be equipped to report their location to the safety cloud, those vehicles typically have no mechanism to explicitly notify the safety cloud when they present a roadway hazard. Additionally, not all objects that are on or near a roadway present a roadway hazard that warrants digital alerting. For example, while a disabled vehicle on the shoulder of a freeway may present a roadway hazard that warrants digital alerting, a disabled vehicle on the side of a residential road may not present a roadway hazard that warrants digital alerting. Additionally, while a bicyclist or pedestrian on the side of a freeway may present a roadway hazard that warrants digital alerting, a bicyclist or pedestrian on the side of a residential roadway may not present a roadway hazard that warrants digital alerting. Thus, whether or not an object may be a roadway hazard that warrants digital alerting may be dependent on many factors including what type of roadway the object is on or near.

In order for a safety system that provides digital alerts to vehicles to be effective, it is important that over alerting, which can lead to alert fatigue, is avoided. In large-scale cloud safety systems, many objects that may present a roadway hazard that warrants digital alerting are not equipped to explicitly notify the safety cloud and it is not practical for a human to evaluate every potential roadway hazard to manually determine if nearby vehicles should be digitally alerted. It has been realized that the process of initiating digital alerting operations for roadway hazards can be automated in a safety cloud by using location information about an object that is received at the safety cloud to determine a characteristic of a road that corresponds to the object and using the characteristic of the road and at least one additional factor that corresponds to the object to automatically determine whether or not nearby vehicles should be digitally alerted. In an example, the functional classification of a road is a characteristic that is determined from location information and the functional classification in addition to at least one other factor that corresponds to the object are used by the safety cloud to automatically determine whether or not to initiate a digital alerting operation. In one example, if digital data received at the safety cloud indicates that a vehicle is on a freeway and that the vehicle has not moved for some period of time (e.g., greater than 120 seconds), then the safety cloud can infer that the current circumstances represent a hazardous condition and can automatically initiate a digital alerting operation for nearby vehicles without any human intervention and without the vehicle being equipped to transmit an explicit alert notification to the safety cloud. In contrast, the safety cloud may not initiate a digital alerting operation if the received digital data indicates that the vehicle is not moving but is on a residential road as such a circumstance may not present a roadway hazard that warrants digital alerting. In another example, if digital data received at the safety cloud from a third party (e.g., from WAZE®) indicates that a bicyclist or a fallen tree is located on a freeway, then the safety cloud can infer that the current circumstances represent a hazardous condition and can automatically trigger a digital alerting operation for nearby vehicles without human intervention and without the cyclist or the fallen tree being equipped to transmit an explicit notification to the safety cloud. Again, in contrast, a bicyclist or fallen tree that is determined to be on a residential road may not present a roadway hazard that warrants digital alerting. Benefits of such a digital alerting technique may include a safety cloud that implements automated and intelligent digital alerting for a wide variety of roadway hazards that avoids alerting fatigue, that does not rely on manual hazard identification, and that does not have to receive explicit notifications from objects that present roadway hazards. Such a technique can enable more hazardous roadway conditions to be automatically and intelligently identified and alerted by the safety cloud, leading to safer roadways while avoiding alerting fatigue and limiting the infrastructure costs of equipping objects with explicit alerting equipment.

As described above, the decision of whether or not to initiate a digital alerting operation is made by the safety cloud based in part on a characteristic of a road that corresponds to the location of an object. For example, the decision of whether or not to initiate a digital alerting operation is made by the safety cloud in response to a functional classification of the road that corresponds to the location of the object. The United States Federal Highway Administration (FHWA) Functional Classification System is used to categorize roads and highways across the United States based on their primary function within the transportation network. This classification system is crucial for effective transportation planning, road design, and infrastructure management. The system is used to assign each road a functional classification code (FC code) that reflects the intended purpose and role of the road in the broader road network. The functional classifications that are assigned to roads are considered as the preexisting functional classifications for purposes of alert messaging. There are seven main functional classifications within this system:

Interstate (FC1): These are the highest-capacity roads, designed for high-speed, uninterrupted travel over long distances. Interstates provide direct connections between major cities and regions. These roads often have limited access points and are designed to accommodate significant traffic volumes.

Other Freeways or Expressways (FC2): Roadways in this functional classification category look very similar to Interstates. While there can be regional differences in the use of the terms 'freeway' and 'expressway', for the purpose of functional classification the roads in this classification have directional travel lanes, are usually separated by some type of physical barrier, and their access and egress points are limited to on- and off-ramp locations or a very limited number of at-grade intersections. Like Interstates, these roadways are designed and constructed to maximize their mobility function, and abutting land uses are not directly served by them.

Other Principal Arterial (FC3): These roads also serve major corridors and connect important urban and rural areas. While these roads may have more access points than freeways, they still carry significant traffic volumes and facilitate efficient regional travel.

Minor Arterial (FC4): Minor arterials connect smaller cities, towns, and important centers. These roads provide medium-distance travel options and help distribute traffic from major arterials to local roads.

Major Collector (FC5): Major collectors gather and distribute traffic within communities and neighborhoods. These roads play a role in linking local streets to higher-class roads, aiding in both local and regional travel.

Minor Collector (FC6): Similar to major collectors, minor collectors facilitate local traffic movement, connecting residential areas, commercial zones, and smaller centers to higher-class roads.

Local (FC7): Local roads primarily provide access to individual properties, residences, and businesses. These roads serve short-distance travel needs and have the lowest traffic volume capacity.

Each of the above-identified functional classifications (FCs) represents a different type of road, with specific design criteria, traffic handling capabilities, and roles within the transportation network. The FHWA Functional Classification System allows transportation agencies to allocate resources, plan road improvements, and manage infrastructure in a way that aligns with the distinct needs of various road types and their respective roles in the broader transportation system. The functional classifications of roads may be embedded into digital maps, including digital maps that are publicly available, such as for example, GOOGLE® Maps, APPLE® Maps, and OpenStreetMap (OSM). Functional classifications of roads may be maintained in other digital maps including proprietary maps and/or government maintained maps. Other governing bodies may use similar roadway functional classification systems, which may be incorporated into the digital alerting techniques disclosed herein.

Although functional classification is one example of a characteristic of a road that can be determined from location information (e.g., from GPS coordinates) received at a safety cloud, other characteristics of roads can be determined from location information received at the safety cloud. For example, location information (e.g., GPS coordinates) may be used to determine a type of road that uses classifications that are different from the FHWA functional classifications, including for example, freeway, ramp, major highway, minor highway, and primary street. Additionally, location information can be used by the safety cloud to determine other characteristics of a road such as an intersection, road width, a roundabout, lane count, lane number, double yellow line, white line, separated by barrier, signalized, non-signalized, speed category, speed limit, direction, toll road, elevation changes, inclines, declines, weight restrictions, bridge clearance, crosswalk, and centerline. Although some examples of characteristics of roads that can be determined from location information are provided, other characteristics of roads can be determined from location information. Any one of the characteristics of a road, or some combination of the characteristics of a road may be used by the safety cloud to determine whether or not to initiate a digital alerting operation for nearby vehicles. Some examples of characteristics of roads and at least one factor that corresponds to an object that can be used to determine whether or not to initiate a digital alerting operation are described below, although it should be understood that other combinations of a characteristic of a road and at least one factor that corresponds to an object can be used to determine whether or not to initiate a digital alerting operation for nearby vehicles.

FIG. 4 is a table 450 of examples of characteristics of roads and at least one additional factor that when considered in combination by the safety cloud can trigger a digital alerting operation. In particular, the first column in the table is a characteristic of a road that corresponds to location information received at a safety cloud, the second column in the table is at least one additional factor that corresponds to the object (e.g., and which is gleaned from the digital data received at the safety cloud), and the third column in the table is an indication of whether or not a digital alerting operation is initiated. The table of FIG. 4 identifies various circumstances in which a digital alerting operation is initiated, and in some implementations a digital alerting operation is not initiated unless one of the enumerated circumstances exists. In an example, a safety cloud is configured to implement logic similar to, or the same as, the logic that is captured in the table of FIG. 4.

The table in FIG. 4 identifies various examples of circumstances that can be gleaned from the digital data that is received at the safety cloud. Some specific examples are mentioned here. In one example, the digital data received at the safety cloud indicates that the object is a vehicle that is stationary, the determined characteristic of the road is a Functional Class (FC) FC1, and initiating the digital alerting operation involves generating vehicle-specific digital alerts for nearby vehicles. In another example, the digital data received at the safety cloud indicates that the object is a vehicle that is in park, the determined characteristic of the road is FC1, and initiating the digital alerting operation involves generating vehicle-specific digital alerts for nearby vehicles. In another example, the digital data received at the safety cloud indicates that the object is a vehicle with a deployed airbag, the determined characteristic of the road is FC1, and initiating the digital alerting operation involves generating vehicle-specific digital alerts for nearby vehicles. In another example, the digital data received at the safety cloud indicates that the object is a bicyclist, the determined type of the road is FC1, and initiating the digital alerting operation involves generating vehicle-specific digital alerts for nearby vehicles. In another example, the digital data received at the safety cloud indicates that the object is a person, the determined type of the road is FC1, and initiating the digital alerting operation involves generating vehicle-specific digital alerts for nearby vehicles. In another example, the digital data received at the cloud computing system indicates that the object is an animal, the determined type of the road is FC1, and initiating the digital alerting operation involves generating vehicle-specific digital alerts for nearby vehicles. In another example, the digital data received at the cloud computing system indicates that the object is a roadway obstacle, the determined characteristic of the road is FC1, and initiating the digital alerting operation involves generating vehicle-specific digital alerts for nearby vehicles. In another example, the digital data indicates that the object is travelling in a particular direction, the determined characteristic of the road is a particular direction of travel (e.g., the northbound lanes of a freeway or the southbound lanes of a freeway), and the particular direction of travel of the object does not match the particular direction of travel of the roadway (e.g., the object is travelling south in the northbound lanes of a freeway).

Figure 5A:
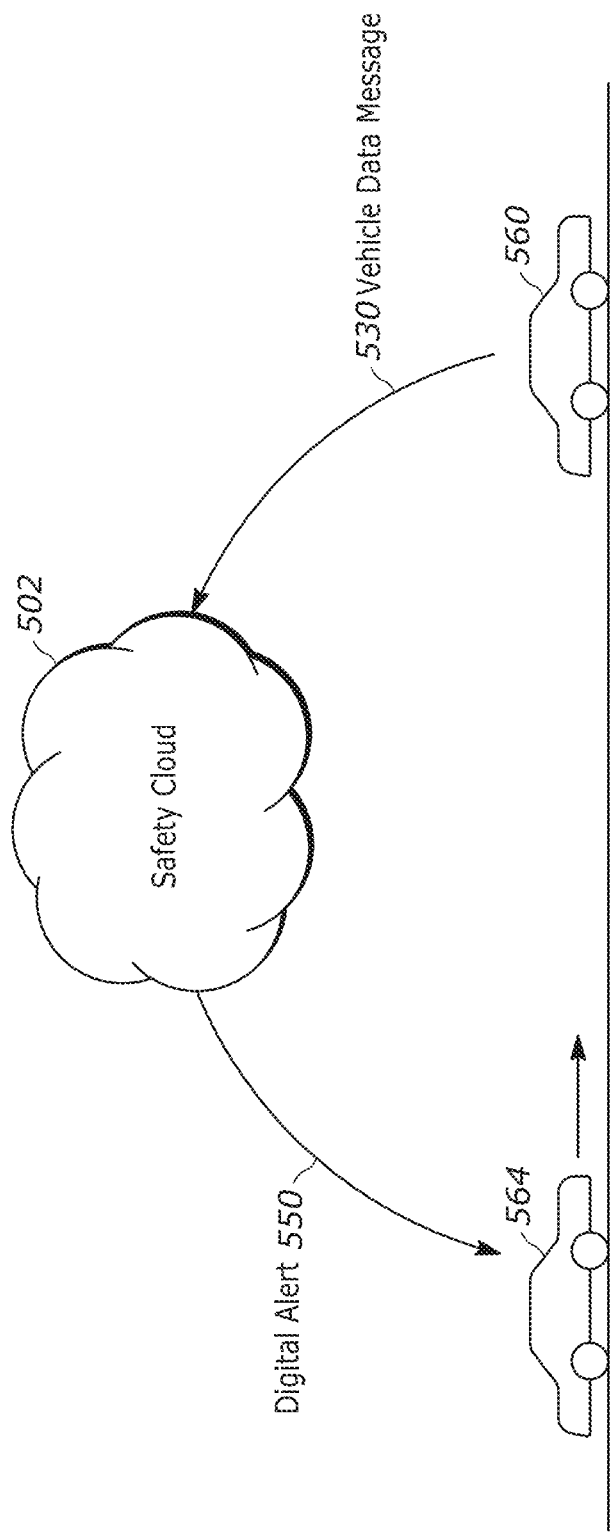
FIG. 5A illustrates a specific example of a circumstance from the table of FIG. 4 in which a digital alerting operation is initiated by a safety cloud.

FIGS. 5A and 5B illustrate a specific example of a circumstance from the table of FIG. 4 in which a digital alerting operation is initiated by a safety cloud 502 without receiving an explicit alert notification from a roadway hazard, which in this case is a disabled vehicle. With reference to FIG. 5A, the vehicle 560 transmits vehicle data messages 530, which include location information, every two seconds and the location information is received by the safety cloud. FIG. 5B is an example of a time-series of location information 562 that is transmitted from the vehicle 560 and received at the safety cloud. As shown in FIG. 5B, each instance of the time-series of location information includes a vehicle ID, a timestamp, and location information in the form of latitude and longitude coordinates. FIG. 5B also indicates that the latitude and longitude coordinates are changing at each time instance from time $t_1$ ($X_1/Y_1$) to time $t_5$ ($X_5/Y_5$), indicating that the vehicle is moving. However, from time $t_5$ ($X_5/Y_5$) through time $t_{11}$ ($X_5/Y_5$), the latitude and longitude coordinates do not change, e.g., they are all "$X_5/Y_5$," indicating that the vehicle is not moving. From the set of vehicle location information as shown in FIG. 5B, the safety cloud determines that the vehicle is on a freeway, e.g., a road having a functional classification of FC2, and that the vehicle is not moving. In an example, if the safety cloud determines that the vehicle is on a freeway (e.g., FC2) and that the vehicle has not moved for at least 120 seconds, then the safety cloud determines that the vehicle is a roadway hazard and initiates a digital alerting operation for nearby vehicles. Such a circumstance is identified in row two of the table of FIG. 4. Upon initiating the digital alerting operation, the safety cloud identifies other vehicles that are within an alerting zone around the stationary vehicle and outputs digital alerts to those vehicles that are within the alerting zone. For example, in the case of a freeway, the alerting zone generated by the safety cloud includes vehicles travelling towards the disabled vehicle and are predicted to encounter the disabled vehicle. FIG. 5A illustrates a digital alert 550 being provided by the safety cloud 502 to a vehicle 564 that is within the alerting zone of the stationary vehicle 560. In the example of FIGS. 5A and 5B, the safety cloud is able to intelligently identify a roadway hazard (e.g., the disabled vehicle) that warrants digital alerting without the vehicle being specifically equipped to send an explicit alert notification to the safety cloud. In fact, the safety cloud is able to identify the road hazard from the time-series of location information that is being provided to the safety cloud. Thus, the safety cloud is able to intelligently identify the roadway hazard from location information (e.g., GPS coordinates) without needing to receive an explicit alert notification about the roadway hazard.

In the example described with reference to FIGS. 5A and 5B, the safety cloud 502 is able to identify a roadway hazard that warrants digital alerting based on location information in a time-series of vehicle data messages. In another example, the safety cloud is able to identify a roadway hazard that warrants digital alerting based on a single vehicle data message. FIG. 6 is a vehicle data message that includes a vehicle ID, location information, and supplemental information in which the location information includes a timestamp and latitude and longitude coordinates and the supplemental information includes an indication that the vehicle is in a "park" state, that is, the drivetrain is in park. From the vehicle data message as shown in FIG. 6, the safety cloud can use the location information to determine a characteristic (e.g., the functional classification) of a road that the vehicle is on and that the vehicle is park (one additional factor that corresponds to the vehicle). In an example, if the safety cloud determines that the vehicle is on a freeway (e.g., FC2) combined with the knowledge that the vehicle is in park, then the safety cloud determines that the vehicle is a roadway hazard that warrants digital alerting. Such a circumstance is identified in row nine of the table of FIG. 4. Upon initiating the digital alerting operation, the safety cloud identifies other vehicles that are within an alerting zone around the stationary vehicle and outputs digital alerts to those vehicles that are within the alerting zone. For example, in the case of a freeway, the alerting zone generated by the safety cloud includes vehicles travelling towards the disabled vehicle that are predicted to encounter the disabled vehicle. Thus, the safety cloud is able to intelligently identify the roadway hazard from GPS location information and from the knowledge that the vehicle is in park without needing to receive an explicit alert notification about the roadway hazard.

Figures 7, 8:
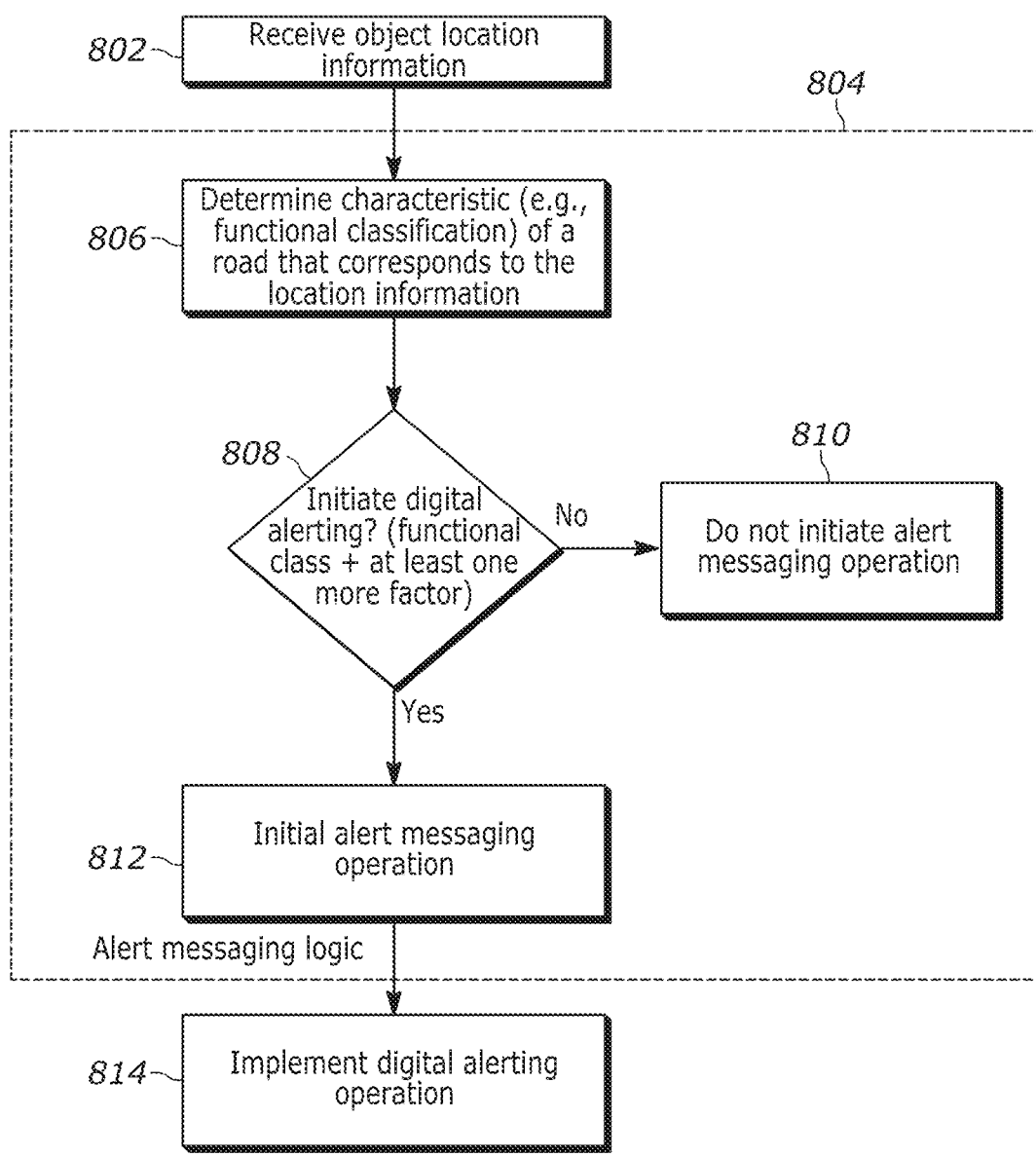
FIG. 7 is an example of digital data that may be received at the safety cloud from a third party that indicates a bicyclist has been identified at a particular time and at a particular location, as indicated by latitude and longitude coordinates.
FIG. 8 is a process flow diagram of a computer-implemented method for alerting vehicles that may be executed within a safety cloud.

As described above, the safety cloud receives telemetry data/information from alerting vehicles and from non-alerting vehicles. The safety cloud may also receive other information (e.g., other digital information) from other sources including third-party sources such as commercial mapping entities (WAZE®, GOOGLE® Maps, APPLE® Maps), weather entities (e.g., government or private sources of weather information), vehicle manufacturers that maintain a vehicle tracking system, and/or from transportation authorities, such as state or local government transportation authorities. Some of the information received at the safety cloud may be used by the safety system to automatically and intelligently identify roadway hazards using the techniques described herein. For example, a commercial mapping entity may provide digital data to the safety cloud that indicates a bicyclist has been identified at a particular location and the particular location of the object combined with the fact that the object is a bicyclist can be used by the safety cloud to determine whether or not to initiate a digital alerting operation. FIG. 7 is an example of digital data 768 that may be received at the safety cloud from a third party that indicates a bicyclist has been identified at a particular time and at a particular location, as indicated by latitude and longitude coordinates. The safety cloud can use the location of the object (e.g., the bicyclist) to determine a characteristic of a road (e.g., the functional classification of the road) that the bicyclist is on and then the safety cloud can use the characteristic of the road and the fact that the object is a bicyclist to determine whether or not to initiate a digital alerting operation. In this case, if the road is determined to be functional classification FC1-FC2, then the bicyclist is determined by the safety cloud to be a roadway hazard that warrants digital alerting and a digital alerting operation is initiated by the safety cloud. Such a circumstance is identified in row five of the table of FIG. 4. However, if the road is determined to be functional classification FC3-FC7, then the bicyclist is not determined to be a roadway hazard that warrants digital alerting by the safety cloud and a digital alerting operation is not initiated by the safety cloud. Thus, the safety cloud is able to intelligently identify the roadway hazard (bicyclist on an interstate or freeway) from GPS location information and from the knowledge that the object is a bicyclist without needing to receive an explicit alert notification about the roadway hazard.

FIG. 8 is a process flow diagram of a computer-implemented method for alerting vehicles that may be executed within a safety cloud. At block 802, the safety cloud receives digital data that includes location information about an object such as a vehicle, a bicyclist, a pedestrian, or some other object. Upon receipt of the location information, the safety cloud system implements alert messaging logic 804. At block 806, a characteristic (e.g., the functional classification) of a road that corresponds to the location information is determined. For example, in a reverse geocoding operation, the location information (e.g., longitude and latitude coordinates) is compared to a digital map to determine a road that corresponds to the object. For example, the location information (e.g., longitude and latitude coordinates) is compared to a digital map, which includes functional classes of roads, to determine the functional classification of the road that corresponds to the location information. In an example, location information (e.g., longitude and latitude coordinates) is provided through an Application Programming Interface (API) to a mapping service that is remote to the safety cloud. The mapping service uses the location information to find a corresponding roadway (e.g., the closest roadway or road segment) and a corresponding characteristic or attribute of the roadway, which may include the functional classification of the roadway. The mapping service returns road at least one characteristic of the road (e.g., the roadway name and the functional classification) to the safety cloud. In another example, the safety cloud system may host a mapping service that is able to determine roads and corresponding characteristics (e.g., functional classifications) from location information (e.g., longitude and latitude coordinates).

Once a characteristic of the road (e.g., the functional classification of the road) has been determined from the location information, at decision point 808, it is determined whether or not to initiate a digital alerting operation. For example, the alert messaging logic determines whether or not to initiate a digital alerting operation based on the characteristic of the road (e.g., the functional classification of the road) and at least one additional factor that corresponds to the object. Some examples of characteristics of roads and additional factors that are considered in conjunction with each other are described with reference to FIG. 4. If circumstances that represent a road hazard do not exist, then at block 810, a digital alerting operation is not initiated by the safety cloud. However, if circumstances that represent a road hazard do exist, then at block 812 a digital alerting operation is initiated by the safety cloud system. In this way, the alert messaging logic is able to determine whether or not a roadway hazard exists based on location information about an object and at least one additional factor that corresponds to the object such that the safety cloud can infer the existence of certain roadway hazards that warrant digital alerting without receiving an explicit notification of the roadway hazard. Next, at block 814, a digital alerting operation is implemented by the safety cloud system. For example, implementing the digital alerting operation may involve sending digital alert messages to nearby vehicles, including for example, vehicles that are within an alerting zone around the location of the roadway hazard. As described with reference to FIG. 8, a computer-implemented method for alerting vehicles, which can be implemented by a safety cloud system, involves receiving, at the safety cloud system, digital data that includes location information about an object, determining, by the safety cloud system, a characteristic of a road that corresponds to the location information, and initiating, by the safety cloud system, a digital alerting operation for nearby vehicles in response to the characteristic of the road and at least one additional factor that corresponds to the object.

Figure 9:
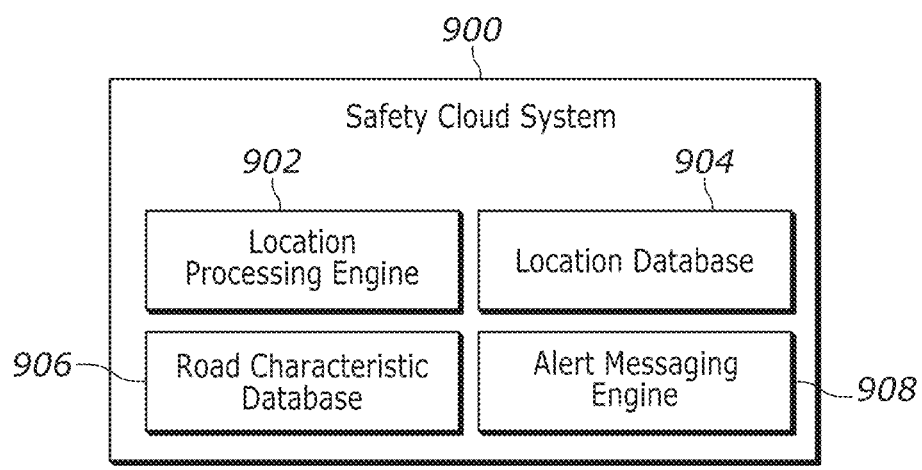
FIG. 9 is a high-level block diagram of a cloud-based safety system.

FIG. 9 is a high-level block diagram of a cloud-based safety system 900, referred to as a safety cloud system or as a safety cloud. The safety cloud system 900 may represent an embodiment of the safety cloud 102 shown in FIG. 1 and/or the safety cloud system 900 may be implemented in a cloud-based safety system. In the example of FIG. 9, the safety cloud system 900 includes a location processing engine 902, a location database 904, a road characteristic database 906, and an alert messaging engine 908. The safety cloud system may be implemented in software, in hardware, or in some combination of software and hardware.

The location processing engine 902 may be configured to process vehicle information from vehicle data messages (e.g., vehicle data messages 330, 340, 630) to determine the locations of vehicles and/or a geographical area of an alerting zone. In an embodiment, the vehicle location information and the geographical area of the alerting zone are stored in the location database 904.

The location database 904 may store information regarding the location of alerting vehicles, AV1 1508-1, AV2 1508-2, and/or AVn 1508-*n* and/or consumer vehicles, V1 1510-1, V2 1510-2, and/or Vn 1510-*n*. For example, the location database may store a database of vehicle ID information and corresponding vehicle location information.

The road characteristic database 906 may store information related to the characteristic of roads such as the functional classifications of roads. In an example, the road characteristic database stores digital mapping information that includes longitude and latitude information, road information, address information, and road characteristics such as functional classifications. In an example, the information is stored in a manner that enables reverse geocoding. In the example of FIG. 9, the road characteristic database is local to the safety cloud system. However, in other embodiments, the road characteristics database is a remote mapping service that is accessed by the safety cloud system using APIs.

The alert messaging engine 908 may implement digital alerting logic as described herein. For example, the alert messaging engine may determine whether or not to initiate a digital alerting operation based on information received at the safety cloud and based on criteria as described herein. In an example, the alert messaging engine uses API calls to obtain a characteristic of a road (e.g., a functional classification) from a mapping service using received object location information. In an embodiment, the alert messaging engine stores an alert messaging ruleset that includes a computer-readable ruleset that implements logic as described herein.

As described above, some digital alerting can be triggered by explicit hazard notifications, such as police cars or fire trucks that send an alert notification message to the safety cloud that explicitly indicates the vehicle's emergency lights are on. However, some digital alerting can be triggered by inferring that a roadway hazard exists based on some information that is received at the safety cloud. For example, the safety cloud can infer that a roadway hazard exists without receiving an explicit hazard notification by using location information about an object and some additional factor about the object to determine that the object presents a roadway hazard that warrants digital alerting. Such a technique can enable more hazardous roadway conditions to be automatically and intelligently identified and alerted by the safety cloud, leading to safer roadways while avoiding alerting fatigue and limiting the infrastructure costs of equipping objects with explicit alerting equipment.

As described above, the safety cloud may be configured with digital alerting rules that identify circumstance which trigger the initiation of a digital alerting operation. Although the safety cloud may be configured with certain circumstances that warrant digital alerting, in other examples, the safety cloud may be configured to learn other circumstances that warrant digital alerting. For example, machine learning (ML) and/or artificial intelligence (AI) techniques may be applied to data that is collected by the safety cloud to identify circumstances that warrant digital alerting. In one example, an ML/AI engine of the safety cloud is able to match incident records with characteristics of roads and at least one additional factor that corresponds to an object to find relationships that might point to new circumstances that warrant digital alerting. Thus, the ML/AI engine may sift through data collected at the safety cloud to predict circumstances that warrant digital alerting. Once such circumstances are identified by the ML/AI engine, the circumstances can be added to the digital alerting rules that are stored at, and executed by, the safety cloud.

The terms "road" and "roadway" are used interchangeably herein to refer to a portion of land that is intended for normal vehicle traffic, commonly including paved roads. The road and/or roadway may include, for example, an area that spans from should to shoulder, from curb to curb, or from guardrail to guardrail. Additionally, a road hazard, or roadway hazard includes any object that may present a hazard to another vehicle that is traveling on the road. In this case, the object may be an inanimate object or animate object. Road hazards may include, for example, other vehicles, bicyclists, pedestrians, vehicle debris (e.g., tires or other vehicle parts), non-vehicle debris (e.g., rocks, trees), water, ice, fire, and smoke, or other obstacle that may be on a road. This list of road hazards is not meant to be comprehensive.

As used herein, the term "hazard lights" and/or "hazard warning lights," is meant to include a single hazard light on a vehicle or multiple hazard lights on a vehicle. Additionally, in an example, the term "hazard lights" and/or "hazard warning lights," refers to such lights as specifically called out by the United States Department of Transportation (DOT), which sets regulations for vehicle lighting through the Federal Motor Vehicle Safety Standards (FMVSS). The specific standard that covers hazard warning lights, or simply "hazard lights," is FMVSS 108, which is titled "Lamps, Reflective Devices, and Associated Equipment." FMVSS 108 outlines the requirements for various types of vehicle lighting, including hazard warning lights, to ensure visibility, safety, and consistency across different vehicles on the road. The standard specifies factors such as light color, intensity, flashing patterns, and positioning on the vehicle. Regarding hazard warning lights, FMVSS 108 specifies the following requirements:

Color and Intensity: Hazard warning lights are typically amber or yellow in color to indicate caution. FMVSS 108 outlines specific requirements for the intensity of the light emitted by these lights to ensure they are easily visible to other road users, even in adverse conditions.

Flashing Patterns: Hazard warning lights must flash in a specific pattern to alert other drivers to the presence of a hazard. The standard defines the rate at which the lights should flash and the duration of each flash, helping to distinguish hazard lights from other types of lights on a vehicle.

Location: Hazard warning lights are usually located at the front and rear of the vehicle, providing visibility to approaching traffic from both directions. FMVSS 108 specifies the placement and positioning of these lights to maximize their effectiveness.

Activation: The standard outlines the conditions under which hazard warning lights should be activated. Typically, hazard lights are used to indicate that a vehicle is temporarily stopped due to an emergency or a hazard on the road.

Compatibility: Hazard warning lights must be designed and installed in a way that does not interfere with the performance of other required vehicle lighting, ensuring that their activation does not confuse other road users.

Note that FMVSS 108 is a detailed and technical document that provides specific measurements, specifications, and testing methods to ensure compliance with the requirements. In the U.S., vehicle manufacturers must adhere to these standards when designing and manufacturing vehicles for the U.S. market to ensure that their hazard warning lights meet the safety and visibility criteria set by the DOT. In an example, the alert messaging logic is applied based on the status of hazard lights, in which the hazard lights are hazard lights as specified by the U.S. DOT.

In an example, a vehicle's location is communicated in terms of longitude and latitude coordinates. Although in other embodiments, the vehicle's location may be communicated in terms of a broader area, such as a two-dimensional area, a street name, a city, a zip code, a road segment, or some other location identifier.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It is understood that the scope of the protection for systems and methods disclosed herein is extended to such a program and in addition to a computer readable means having a message therein, such computer readable storage means contain program code means for implementation of one or more steps of the method, when the program runs on a server or mobile device or any suitable programmable device.

In some embodiments, the technique for vehicle data collection includes a non-transitory computer readable medium including instructions to be executed in a computer system. For example, the instructions when executed in the computer system perform a technique that includes receiving, at the safety cloud system, digital data that includes location information about an object, determining, by the safety cloud system, a characteristic of a road that corresponds to the location information, and initiating, by the safety cloud system, a digital alerting operation for nearby vehicles in response to the characteristic of the road and at least one additional factor that corresponds to the object.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the above-described techniques are described in a general context, those skilled in the art will recognize that the above-described techniques may be implemented in software, hardware, firmware, or a combination thereof. The above-described embodiments of the invention may also be implemented, for example, by operating a computer system to execute a sequence of machine-readable instructions. The instructions may reside in various types of computer readable media. In this respect, another aspect of the present invention concerns a programmed product, comprising computer readable media tangibly embodying a program of machine-readable instructions executable by a digital data processor to perform the method in accordance with an embodiment of the present invention.

The computer readable media may comprise, for example, random access memory (not shown) contained within the computer. Alternatively, the instructions may be contained in another computer readable media such as a magnetic data storage diskette and directly or indirectly accessed by a computer system. Whether contained in the computer system or elsewhere, the instructions may be stored on a variety of machine-readable storage media, such as a direct access storage device (DASD) storage (e.g., a conventional "hard drive" or a Redundant Array of Independent Drives (RAID) array), magnetic tape, electronic read-only memory, an optical storage device (e.g., CD ROM, WORM, DVD, digital optical tape), paper "punch" cards. In an illustrative embodiment of the invention, the machine-readable instructions may comprise lines of compiled C, C++, or similar language code commonly used by those skilled in the programming for this type of application arts.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A computer-implemented method for alerting vehicles, the method comprising:
    receiving, at a cloud computing system, digital data that includes location information about an object;
    determining, by the cloud computing system, a functional classification (FC) of a road that corresponds to the location information; and
    initiating, by the cloud computing system, a digital alerting operation for nearby vehicles in response to the FC of the road and at least one additional factor that corresponds to the object.

2. The computer-implemented method of claim 1, wherein the digital data received at the cloud computing system indicates that the object is a vehicle that is stationary, the determined FC of the road is FC1, the at least one additional factor that corresponds to the object is that the object is a stationary vehicle, and wherein initiating the digital alerting operation involves generating vehicle-specific digital alerts for nearby vehicles.

3. The computer-implemented method of claim 1, wherein the digital data received at the cloud computing system indicates that the object is a vehicle that is in park, the determined FC of the road is FC1, and the at least one additional factor that corresponds to the object is that the object is a vehicle in park, wherein initiating the digital alerting operation involves generating vehicle-specific digital alerts for nearby vehicles.

4. The computer-implemented method of claim 1, wherein the digital data received at the cloud computing system indicates that the object is a vehicle with a deployed airbag, the determined of the road is FC1, the at least one additional factor that corresponds to the object is that the object is a vehicle with a deployed airbag, and wherein initiating the digital alerting operation involves generating vehicle-specific digital alerts for nearby vehicles.

5. The computer-implemented method of claim 1, wherein the digital data received at the cloud computing system indicates that the object is a bicyclist, the determined FC of the road is FC1, the at least one additional factor that corresponds to the object is that the object is a bicycle, and wherein initiating the digital alerting operation involves generating vehicle-specific digital alerts for nearby vehicles.

6. The computer-implemented method of claim 1, wherein the digital data received at the cloud computing system indicates that the object is a pedestrian, the determined FC of the road is FC1, the at least one additional factor that corresponds to the object is that the object is a pedestrian, and wherein initiating the digital alerting operation involves generating vehicle-specific digital alerts for nearby vehicles.

7. The computer-implemented method of claim 1, wherein the digital data received at the cloud computing system indicates that the object is an animal, the determined FC of the road is FC1, the at least one additional factor that corresponds to the object is that the object is an animal, and wherein initiating the digital alerting operation involves generating vehicle-specific digital alerts for nearby vehicles.

8. The computer-implemented method of claim 1, wherein the digital data received at the cloud computing system indicates that the object is a roadway obstacle, the determined FC of the road is FC1, the at least one additional factor that corresponds to the object is that the object is a roadway obstacle, and wherein initiating the digital alerting operation involves generating vehicle-specific digital alerts for nearby vehicles.

9. The computer-implemented method of claim 1, wherein the digital data indicates that the object is travelling in a particular direction, the method further comprising determining a particular direction of travel of the road from the location information, and wherein the particular direction of travel of the object does not match the particular direction of travel of the road.

10. The computer-implemented method of claim 1, wherein the digital alerting operation involves determining an alerting zone relative to the object, identifying vehicles that are within the alerting zone, and outputting vehicle-specific digital alerts for the vehicles that are within the alerting zone.

11. The method of claim 1, wherein the FC of the road is a functional classification that includes interstate, other freeways or expressways, other principal arterial roadways, minor arterial, major collector, minor collector, and local roadways.

12. The method of claim 11, wherein functional classifications of roads are functional classifications as defined by a government transportation agency.

13. The method of claim 1, wherein determining the FC of the road that corresponds to the location information involves a reverse geocoding operation in which the location information is compared to a digital map to determine the FC of the road.

14. The method of claim 1, wherein determining the FC of the road that corresponds to the location information involves a reverse geocoding operation in which the location information is compared to a digital map to determine the FC of the road.

15. A non-transitory computer readable medium comprising instructions to be executed in a computer system, wherein the instructions when executed in the computer system perform a method comprising:
    receiving, at a cloud computing system, digital data that includes location information about an object;
    determining, by the cloud computing system, a functional classification (FC) of a road that corresponds to the location information; and
    initiating, by the cloud computing system, a digital alerting operation for nearby vehicles in response to the FC of the road and at least one additional factor that corresponds to the object.

16. A system comprising:
    at least one processor and a non-transitory computer readable medium comprising instructions to be executed by the at least one processor, wherein the instructions when executed by the at least one processor perform a method that includes;

receiving, at a cloud computing system, digital data that includes location information about an object;

determining, by the cloud computing system, a functional classification of a road that corresponds to the location information; and initiating, by the cloud computing system, a digital alerting operation for nearby vehicles in response to the FC of the road and at least one additional factor that corresponds to the object.

17. The system of claim 16, wherein the digital data received at the cloud computing system indicates that the object is a vehicle that is stationary, the determined FC of the road is FC1, the at least one additional factor that corresponds to the object is that the object is a stationary vehicle, and wherein initiating the digital alerting operation involves generating vehicle-specific digital alerts for nearby vehicles.

18. The non-transitory computer readable medium of claim 15, wherein the digital data received at the cloud computing system indicates that the object is a vehicle that is stationary, the determined FC of the road is FC1, the at least one additional factor that corresponds to the object is that the object is a stationary vehicle, and wherein initiating the digital alerting operation involves generating vehicle-specific digital alerts for nearby vehicles.

* * * * *